United States Patent [19]

Zweifel

[11] Patent Number: 4,589,616
[45] Date of Patent: May 20, 1986

[54] CRUISE AIRSPEED CONTROL OF AIRCRAFT ALTITUDE CAPTURE

[75] Inventor: Terry L. Zweifel, Phoenix, Ariz.

[73] Assignee: Sperry Corporation, New York, N.Y.

[21] Appl. No.: 573,446

[22] Filed: Jan. 24, 1984

[51] Int. Cl.$^4$ .............................................. G05D 1/08
[52] U.S. Cl. .................................. 244/180; 244/182; 244/188; 60/906
[58] Field of Search ............... 244/180, 182, 188, 186, 244/76 R, 175; 60/906; 364/431.01, 431.02, 431.07, 433; 318/584

[56] References Cited

U.S. PATENT DOCUMENTS

| | | | |
|---|---|---|---|
| 2,664,254 | 12/1953 | Hendrickson | 244/182 |
| 3,240,446 | 3/1966 | Miller | 318/584 |
| 3,591,110 | 7/1971 | Dramer | 244/188 |
| 3,638,092 | 1/1972 | Kammerer | 318/584 |
| 3,813,063 | 5/1974 | Martin | 244/182 |
| 4,114,842 | 9/1978 | Hofferber et al. | 244/180 |
| 4,205,814 | 6/1980 | Larson et al. | 244/182 |
| 4,277,041 | 7/1981 | Marrs et al. | 244/182 |

FOREIGN PATENT DOCUMENTS 1013869 12/1965 United Kingdom ............... 244/182

Primary Examiner—Trygve M. Blix
Assistant Examiner—Rodney Corl
Attorney, Agent, or Firm—Howard P. Terry; Arnold L. Albin

[57] ABSTRACT

An aircraft speed control system for use with an automatic throttle position control system and automatic flight control system permits capturing and maintaining a commanded airspeed during the capturing of a desired altitude from either climbing or descending flight. The system manipulates the throttles at a variable rate dependent on the difference between the actual thrust of the aircraft and the desired cruising thrust at the selected airspeed and inversely proportional to the actual altitude rate. A signal derived from thrust error and altitude rate signals is utilized to generate a limiter control signal which is combined with an engine pressure ratio signal to generate a drive signal for urging the aircraft to capture precisely the commanded airspeed.

13 Claims, 5 Drawing Figures

CRUISE AIRSPEED CONTROL OF AIRCRAFT ALTITUDE CAPTURE

BACKGROUND OF THE INVENTION

1. Field of the Invention

The present invention relates generally to aircraft automatic flight control systems, and more particularly to an automatic throttle position control system for achieving and maintaining a commanded cruising airspeed during the capturing of a desired altitude from either ascending or descending flight.

2. Description of the Prior Art

Most modern commercial transport aircraft, many general aviation aircraft, and some millitary aircraft are equipped with automatic flight control systems which generally assist the human pilot in efficiently maneuvering the aircraft from a state of ascending or descending flight to achieve a commanded cruising altitude. In addition, many aircraft are equipped with automatic throttle control systems which manipulate the aircraft engine throttles to achieve a desired thrust level or to capture and maintain a manually selected or computed airspeed. Aircraft having both automatic flight control systems and autothrottle systems are referred to as fully coupled, whether the systems work independently or in a complementary mode, as in performance management systems for controlling the vertical path of the aircraft or flight management systems for controlling both the vertical and horizontal path of the aircraft.

In view of the substantial increases in fuel costs, aircraft operators are very desirous of increasing fuel efficiencies throughout the entire vertical flight profile of their flight plans by assuring the most cost-effective operations possible. A particular objective of such operations is to obtain smooth, stable and accurate airspeed control during cruise and when the automatic flight control system commands the aircraft to accelerate, decelerate or change its flight path in the vertical plane. Further, during the capture of a cruise altitude, it is desirable, if not mandatory, to maintain the aircraft's speed within predefined limits. Typical of such cases is that where the pilot is mandated by Air Traffic Control to decelerate to a specified speed at a specified altitude in order to maintain air traffic separation. For example, in the United States the maximum speed of aircraft is restricted by the Federal Aviation Administration of 250 nautical miles per hour in flight below 10,000 feet of altitude. Thus, should the human pilot elect to capture a cruising altitude less than 10,000 feet of altitude while climbing at 250 nautical miles per hour, it is necessary that the aircraft's speed not exceed the speed restriction during the capture manuever and subsequent cruise at the selected altitude. Once the aircraft has reached the desired altitude, the engine thrust must be increased or reduced to that value which will maintain the desired airspeed.

In the prior art, control of speed during the altitude capture maneuver was generally performed by adjusting the throttles in a manner proportional to airspeed error in an attempt to minimize speed deviations. Such schemes are well-known to those skilled in the art and are generally of the classical proportional plus integral or proportional plus derivative (or a combination of both) servo control systems with airspeed as the controlled parameter. The proportional and integral system tends to reduce steady-state errors, while the proportional and derivative system has no effect on steady-state errors and reduces transient errors.

Since the time constant of the airspeed control response associated with the autothrottle commands is of the order of 5–10 seconds, an accurate, responsive control function requires an input that anticipates the airspeed change resulting from altitude change maneuvers. The shortcoming of many prior art systems is that they are purely reactive in nature; i.e., a significant airspeed error is required before corrective action is taken by the autothrottle system. Thus, highly responsive systems generally result in unacceptable throttle activity, while highly filtered systems are sluggish and allow large speed deviations to occur before corrective action is taken and may lead to instability.

Other prior art systems, particularly performance management systems and flight management systems, generally compute the thrust required to maintain the cruise speed, usually expressed as an operational characteristic of the engine, such as engine pressure ratio (EPR) or engine fan speed ($N_1$), and drive the throttles at a constant rate to achieve the desired cruise thrust setting during the altitude capture maneuver. The shortcoming of this scheme is that the constant throttle rate does not assure adequate speed control for all capture manuevers because of the associated change in pitch attitude. For example, large speed losses can occur if the capture manuever is begun at large rates of climb or descent and, similarly, excessive overspeed conditions can occur if the capture maneuver is initiated at relatively small rates or climb or descent. Further, if a high rate of throttle change is commanded, the resulting acceleration may prove uncomfortable to passengers.

The present invention overcomes the shortcomings of the prior art systems by manipulating the throttles at a variable rate responsive to the actual capture maneuver itself. The throttles are restricted to rates dependent on the difference between the instantaneous actual thrust of the aircraft (in EPR) and the final cruising thrust and upon the actual altitude rate to automatically advance or retard the engine throttles in such a manner as to assure that the rate of throttle movement maintains the speed of the aircraft throughout the automatic altitude capture manuever.

SUMMARY OF THE INVENTION

In accordance with the present invention the disadvantages of prior art systems are overcome by an engine control apparatus for use in an automatic flight control system having an automatic throttle position controller. The apparatus provides airspeed control of an aircraft during an altitude capture maneouver. It provides a first signal corresponding to actual engine thrust, a second signal corresponding to a predetermined thrust at the commanded airspeed, and an altitude rate signal. The signals are combined to develop a command signal so that the throttles are automatically advanced or retarded in such a manner as to assure that the rate of throttle movement maintains the speed of the aircraft throughout the automatic altitude capture maneuver. The system manipulates the throttles at a variable rate dependent on the difference between the actual thrust of the aircraft and the desired cruising thrust at the selected airspeed, and inversely proportional to the actual altitude.

Upon initialization of the system, which may be enabled automatically by the altitude capture command, the thrust required to maintain the desired final cruise airspeed at the selected altitude is computed based on programmed data for optimum aircraft performance. This required thrust may be measured in terms of engine pressure ratio (EPR) and is used to generate a signal proportional thereto.

A signal derived from a suitable engine sensor representing the actual EPR is compared with the predetermined final cruise EPR to provide an EPR drive signal, which is introduced through an amplitude limiter stage at a suitable gain level to drive a throttle control linkage through a servo-motor. Simultaneously, an altitude rate signal is developed, which may be obtained from an air data computer. The altitude rate signal is combined with the EPR drive signal in accordance with an altitude control law to provide a variable threshold to the limiter. The linkage drive signal is thereby limited to a maximum rate which is a function of EPR, altitude rate, and a constant proportional to a predetermined value of acceleration normal to the flight path of the aircraft. This causes the throttle to be driven at a rate which will reach the predicted EPR when the selected altitude has been captured. The autothrottle system is thereby caused to increase or decrease the airspeed at an optimal rate, to maintain the aircraft's speed.

DESCRIPTION OF THE PREFERRED EMBODIMENTS

The present invention is useful in any aircraft having both an automatic flight control system capable of capturing preselected cruising altitudes and an autothrottle system, as in a fully coupled performance management system or flight management system.

Figure 1:
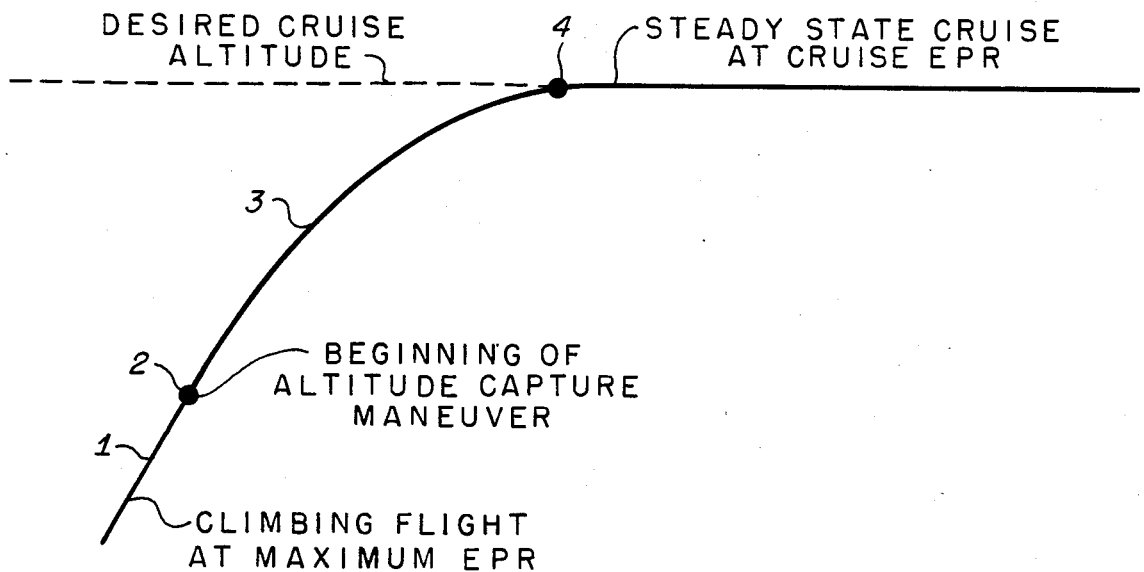
FIG. 1 shows a typical automatic altitude capture characteristic from a state of climbing flight.
Figure 2:
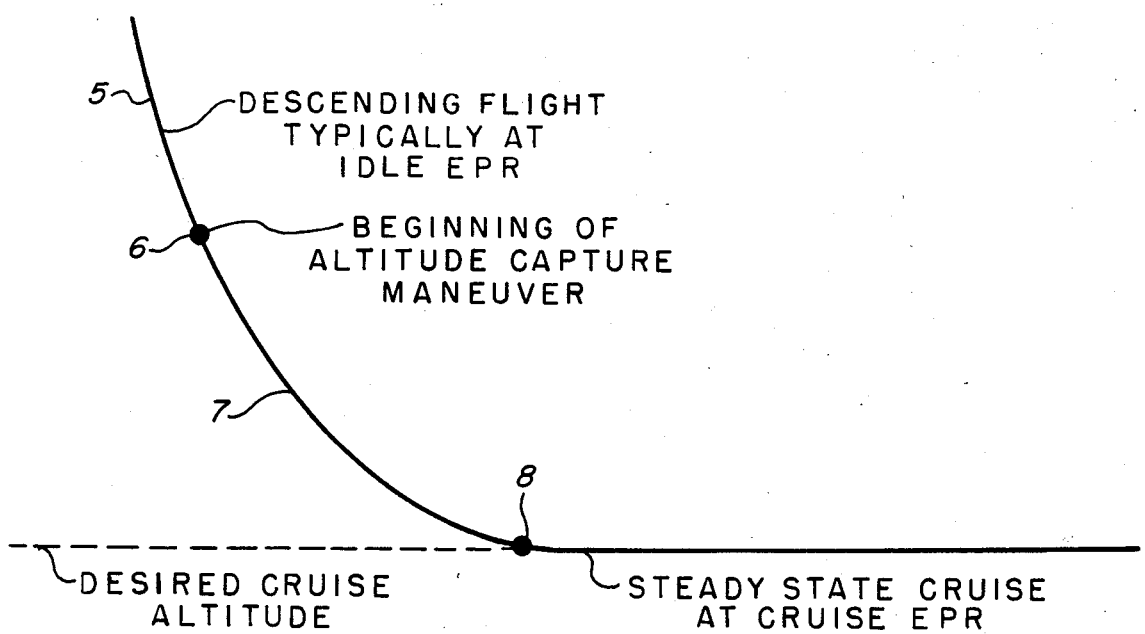
FIG. 2 shows a typical automatic altitude capture characteristic from a state of descending flight.

The application of the present invention may be illustrated by referring to FIGS. 1 and 2. FIG. 1 illustrates a typical altitude capture maneuver from a state of climbing flight. Line segment 1 represents the flight path occurring while the aircraft is urged to climb at a specific speed with the engine thrust set at a maximum allowable value. At point 2, the automatic flight control system is enabled and begins the capture of the desired cruise altitude and engages the throttle control system of the present invention, thereby reducing the rate of climb while approaching the desired cruise airspeed. Line segment 3 represents the subsequently commanded flight path of the aircraft during the capture maneuver. At point 4, where the aircraft has achieved the desired steady state cruise altitude, the throttles have been driven to a setting for producing the proper thrust to maintain the desired cruise altitude.

FIG. 2 shows the automatic capture of an altitude from a descending flight path. Line segment 5 represents the flight path of the aircraft at a specific speed with the engines typically producing idle thrust. At point 6, the automatic flight control system begins the altitude capture maneuver along line segment 7, reducing the rate of descent, and initiates the capture command of the present invention. As in the case for climbing flight, the throttle setting at point 8, when the desired steady state cruise altitude has been attained, will correspond to the thrust required to maintain the desired speed.

Before discussing the preferred embodiments of the apparatus of the present invention, a discussion of the various mathematical relationships determining the throttle control law and their derivations will be provided in order to facilitate an understanding of the preferred embodiments.

Referring again to FIGS. 1 and 2, it will be understood that in the general case of an automatic altitude capture, the aircraft must change its flight path angle from some value, either positive (for ascending flight) or negative (for descending flight) to zero at the cruise altitude. Thus, associated with any altitude capture is an angular change $\Delta\gamma$ which, for unaccelerated flight, is related to the thrust, drag, and weight of the aircraft according to the well-known relationship:

$$\Delta\gamma = (T_1 - D_1)/W_1 - (T_2 - D_2)/W_2 \tag{1}$$

where:
$\Delta\gamma$ = required change in flight path angle measured in radians
$T$ = thrust of the aircraft, measured in pounds
$D$ = aerodynamic drag of the aircraft, measured in pounds
$W$ = actual gross weight of the aircraft, measured in pounds.

The subscript 1 in the above equation refers to the current state of the altitude capture maneuver and the subscript 2 refers to the final or cruise condition.

The change in flight path angle may also be computed using a geometric approximation for small angles of $\Delta\gamma$:

$$\Delta\gamma = \dot{h}_1/V_1 - \dot{h}_2/V_2 \tag{2}$$

where $\dot{h}$ is actual altitude rate of the aircraft measured in feet per second and V is true airspeed of the aircraft (in the direction of flight) measured in feet per second. The subscripts refer to the current and final states as described above.

Thus, setting equation (1) equal to equation (2):

$$(T_1 - D_1)/W_1 - (T_2 - D_2)/W_2 = \dot{h}_1/V_1 - \dot{h}_2/V_2 \tag{3}$$

Since for a constant speed, the aerodynamic drag does not change with the change in flight path angle, $D_1 = D_2 = D$. Furthermore, since the weight change of the aircraft during the altitude capture maneuver is negligible, i.e. $W_1 = W_2 = W$, and the altitude rate $\dot{h}_2$ in cruise is equal to zero:

$$(T_1 - T_2)/W = \dot{h}_1/V_1 \tag{4}$$

Defining the change in thrust between the current state and the final or cruise state as $\Delta T = (T_1 - T_2)$ and rearranging yields:

$$\Delta T/\dot{h}_1 = W/V_1 \tag{5}$$

It will be seen that the term $W/V_1$ is a constant when the airspeed V does not vary, since W is also a constant if weight loss due to fuel consumption is negligible. Maintaining the airspeed $V_1$ a constant is the objective during the capture maneuver. Thus:

$$\Delta T/\dot{h}_1 = \text{constant} \tag{6}$$

The term $\Delta T$ represents the total thrust change required during the capture maneuver.

Figure 3:
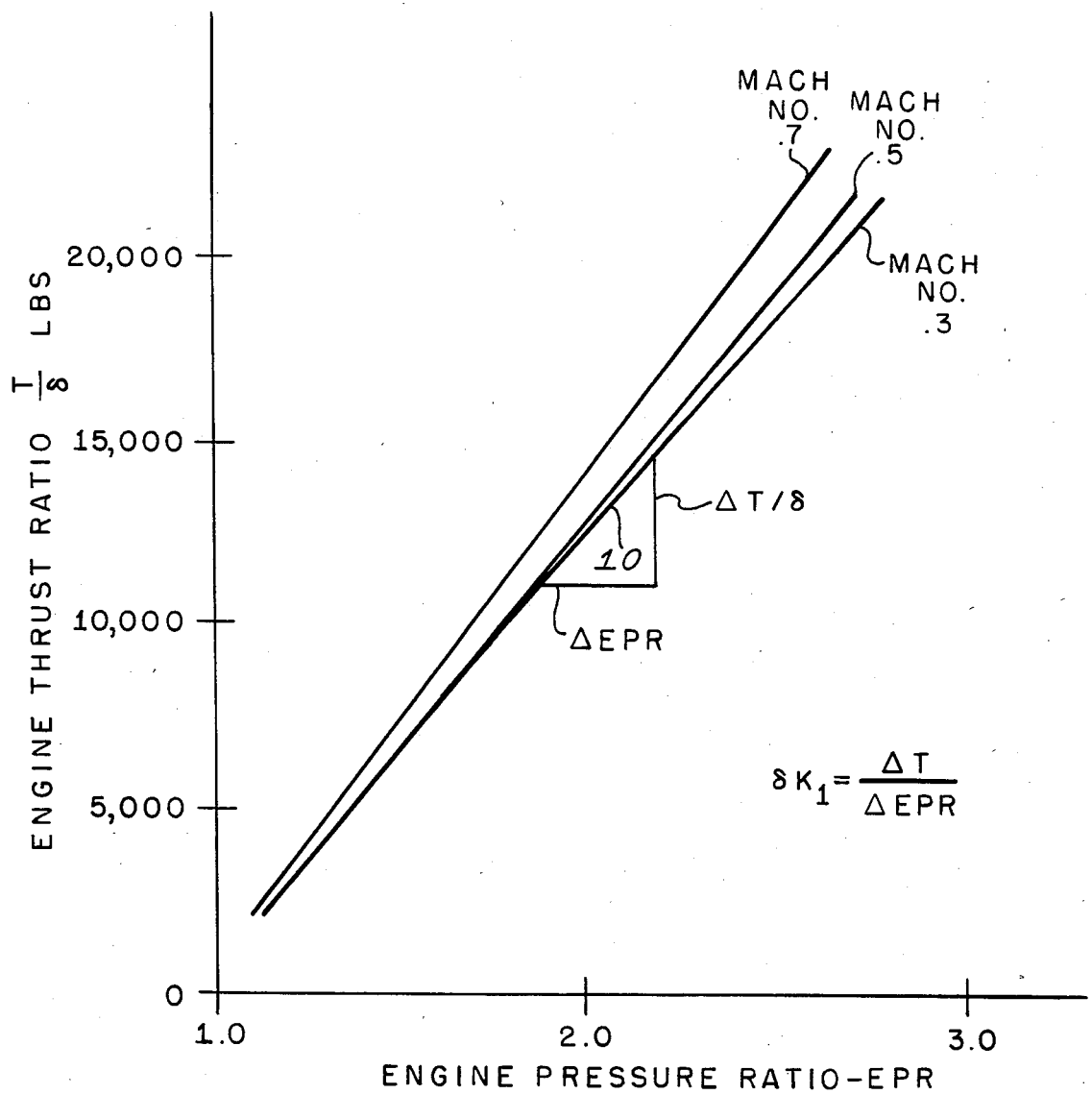
FIG. 3 is a graph illustrating a representative relationship between the thrust of a jet engine and the engine pressure ratio.

Referring now to FIG. 3, it may be seen that the relationship between the thrust T of an engine divided by the ratio $\delta$ of atmospheric pressure at the cruise altitude to sea level atmospheric pressure, $T/\delta$, to the engine pressure ratio, EPR, is virtually linear. Hence, EPR may be used as an operational characteristic representing actual engine thrust. The slope of the line 10 represents the relationship between a change in thrust ratio $\Delta T/\delta$ during the capture maneuver and a change in engine pressure ratio $\Delta EPR$, and is thus a constant of proportionality K between the two parameters. Since, for a multiengine aircraft, the resultant change in thrust is the sum of the EPR's for the engines, $$\Delta T = \delta K \sum_{n=1}^{n} \Delta EPR \tag{7}$$

where:
$\Delta T$ = the change in aircraft thrust measured in pounds
$\delta$ = atmospheric pressure at the cruise altitude divided by the pressure at sea level, and is dimensionless
K = a proportionality constant, measured in pounds
$\Delta EPR$ = the required change in engine pressure ratio corresponding to a change in thrust for a given engine, and is dimensionless
n = the number of engines on the aircraft.

In practice, the changes in EPR for each engine are virtually identical so that:

$$\Delta T = n\delta K \Delta EPR \tag{8}$$

Substituting equation (8) into equation (6):

$$n\delta K \Delta EPR / \dot{h}_1 = C_1 \tag{9}$$

where $C_1$ is a constant. Since n, $\delta$, and K are also constants:

$$\Delta EPR / \dot{h}_1 = C_2 \tag{10}$$

where $C_2 = C_1/n\delta K$.
Taking the derivative of equation (10) with respect to time yields:

$$(\dot{h}_1 \Delta \dot{EPR} - \ddot{h}_1 \Delta EPR)/\dot{h}_1^2 = 0 \tag{11}$$

or:

$$\dot{h}_1 \Delta \dot{EPR} - \ddot{h}_1 \Delta EPR = 0 \tag{12}$$

Since the change in engine pressure ratio $\Delta EPR$ may also be defined as $$\Delta EPR = EPR(\text{actual}) = EPR(\text{cruise}) \tag{13}$$

and as the value of EPR required to maintain cruise at the desired speed is a constant for constant atmospheric conditions, then, differentiating:

$$\Delta \dot{EPR} = \dot{EPR}(\text{actual}) - 0 \tag{14}$$

and simplifying yields:

$$\Delta \dot{EPR} = \dot{EPR}(\text{actual}) \tag{15}$$

Solving equations (12) and (15) above for EPR yields:

$$\dot{EPR} = (\ddot{h}_1 \Delta EPR)/\dot{h}_1 \tag{16}$$

since $\ddot{h}$ is the time rate of change of altitude rate $\dot{h}$, a suitable value may be determined by relating it to the well-known automatic flight control system altitude capture control law (see, for example, U.S. Pat. No. 4,114,842):

$$\Delta H + K_1 \dot{H} = 0 \tag{17}$$

where:
$\Delta H$ = the difference between a selected altitude and the actual altitude.
$K_1$ = a characterizing parameter that determines the shape of the capture flight path.
$\dot{H}$ = the actual altitude rate in feet per second.

In accordance with control law (17), $\ddot{h}_1$ is generally constrained to 3.217 ft/sec/sec (0.1 g) or less acceleration normal to the aircraft flight path to limit acceleration forces imposed on the aircraft during the capture maneuver. Using this value in equation 16 yields:

$$\dot{EPR} = 3.217 \Delta EPR / \dot{h}_1 \tag{18}$$

Figure 4:
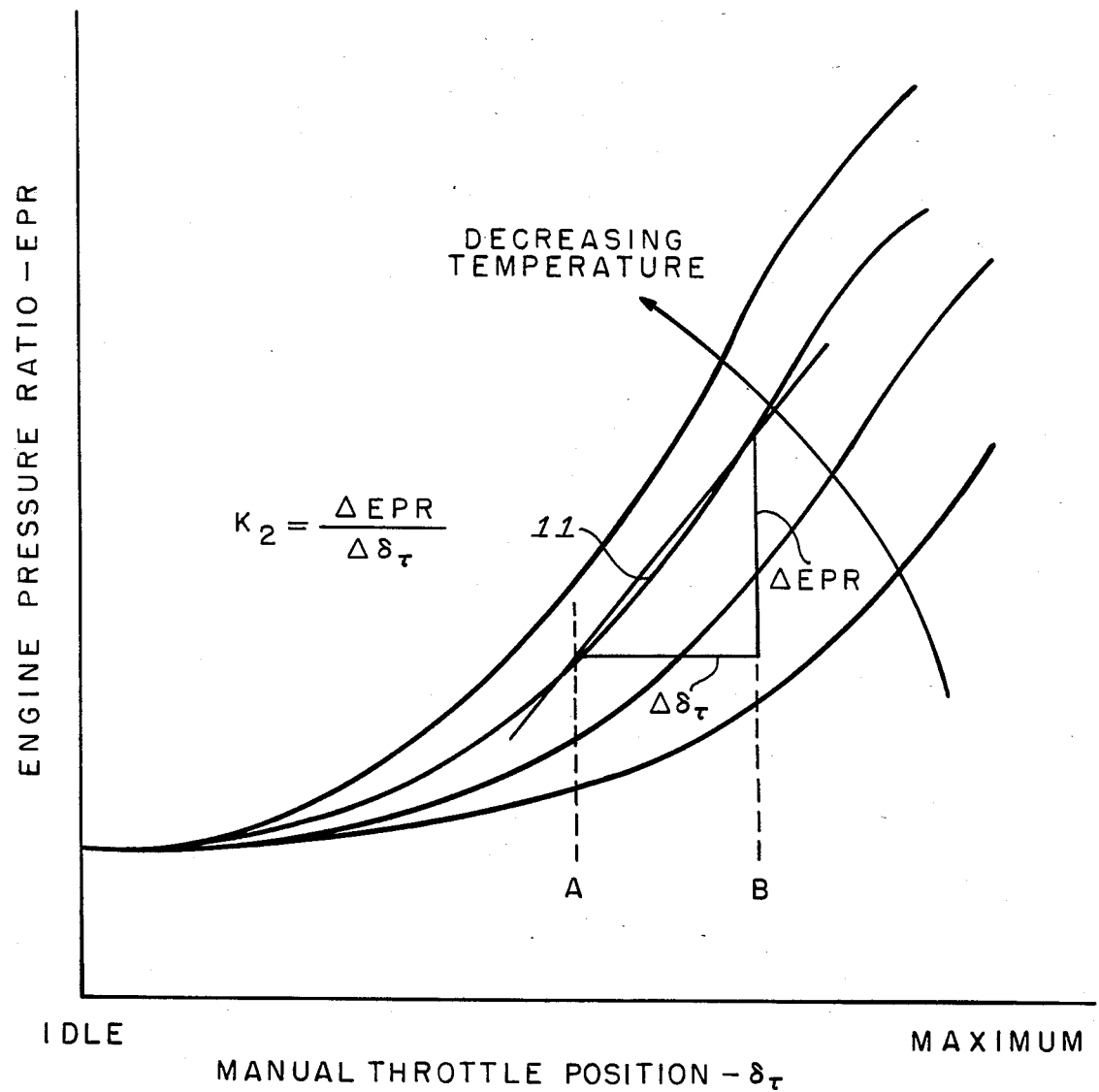
FIG. 4 shows typical characteristic curves of engine pressure ratio as a function of throttle position with varying ambient temperature.

To convert EPR to an equivalent throttle rate $\dot{\delta}_T$ refer now to FIG. 4, which illustrates a typical relationship between engine pressure ratio EPR and actual manual throttle position $\Delta\tau$ in the cockpit of an aircraft. It will be seen that the relationship is a function of temperature and that the curve between points A and B for a selected temperature can be approximated by a straight line 12, as shown in the Figure. From this straight line approximation, the slope of the line may be computed:

$$K_2 \Delta EPR / \Delta \delta_T \tag{19}$$

where:
$K_2$ = the slope of the straight line approximation
$\Delta EPR$ = the difference between EPR's at two distinct throttle positions, for example throttle positions A and B
$\Delta \delta_T$ = a reference change in throttle position, for example throttle positions corresponding to points A and B.

The variation in the value of $K_2$ with change in temperature is small and thus a constant value of $K_2$ may be chosen for use at all reasonable temperatures.

Solving equation (19) for $\Delta EPR$ yields:

$$\Delta EPR = K_2 \Delta \delta_T \tag{20}$$

From equation (13):

$$\Delta EPR = EPR(\text{actual}) - EPR(\text{cruise}) \tag{21}$$

Similarly, from (20)

$$\Delta \delta_T = \delta_T(\text{actual}) - \delta_T(\text{cruise}) \tag{22}$$

Since in the final or cruise condition both the throttle position and the EPR for cruise are constants, differentiating (21) and (22) yields, respectively:

$$\Delta \dot{EPR} = \dot{EPR}(\text{actual}) \qquad (23)$$

and $$\Delta \dot{\delta}\tau = \dot{\delta}\tau(\text{actual}) \qquad (24)$$

Taking the derivative of equation (20) with respect to time:

$$\Delta \dot{EPR} = K_2 \Delta \dot{\delta}\tau \qquad (25)$$

and substituting equations (24) and (25) in (23):

$$\dot{EPR} = K_2 \dot{\delta}\tau \qquad (26)$$

Substituting equation (26) into equation (18) and solving for $\dot{\delta}\tau$ results in:

$$\dot{\delta}\tau = (3.217/K_2) \times (\Delta \dot{EPR}/\dot{h}_1) \qquad (27)$$

Defining a new constant $K = 3.217/K_2$ gives the desired relationship for the required throttle rate to maintain speed during an altitude capture maneuver:

$$\dot{\delta}\tau = K \Delta \dot{EPR}/\dot{h}_1 \qquad (23)$$

A satisfactory value of K for the prefered embodiment for a Boeing 727 aircraft is 4000; however, the principles should apply, with a modification of K, in general, to any aircraft.

Since the algebraic sign of ΔEPR controls the direction in which the throttles move, the rate limit must always be a positive number. Therefore it is necessary to take the absolute values of ΔEPR and $\dot{h}_1$ to determine the rate limit which is applied to control the throttle:

$$\dot{\delta}_\tau = 4000 \left| \frac{\Delta EPR}{\dot{h}_1} \right|. \qquad (29)$$

Figure 5:
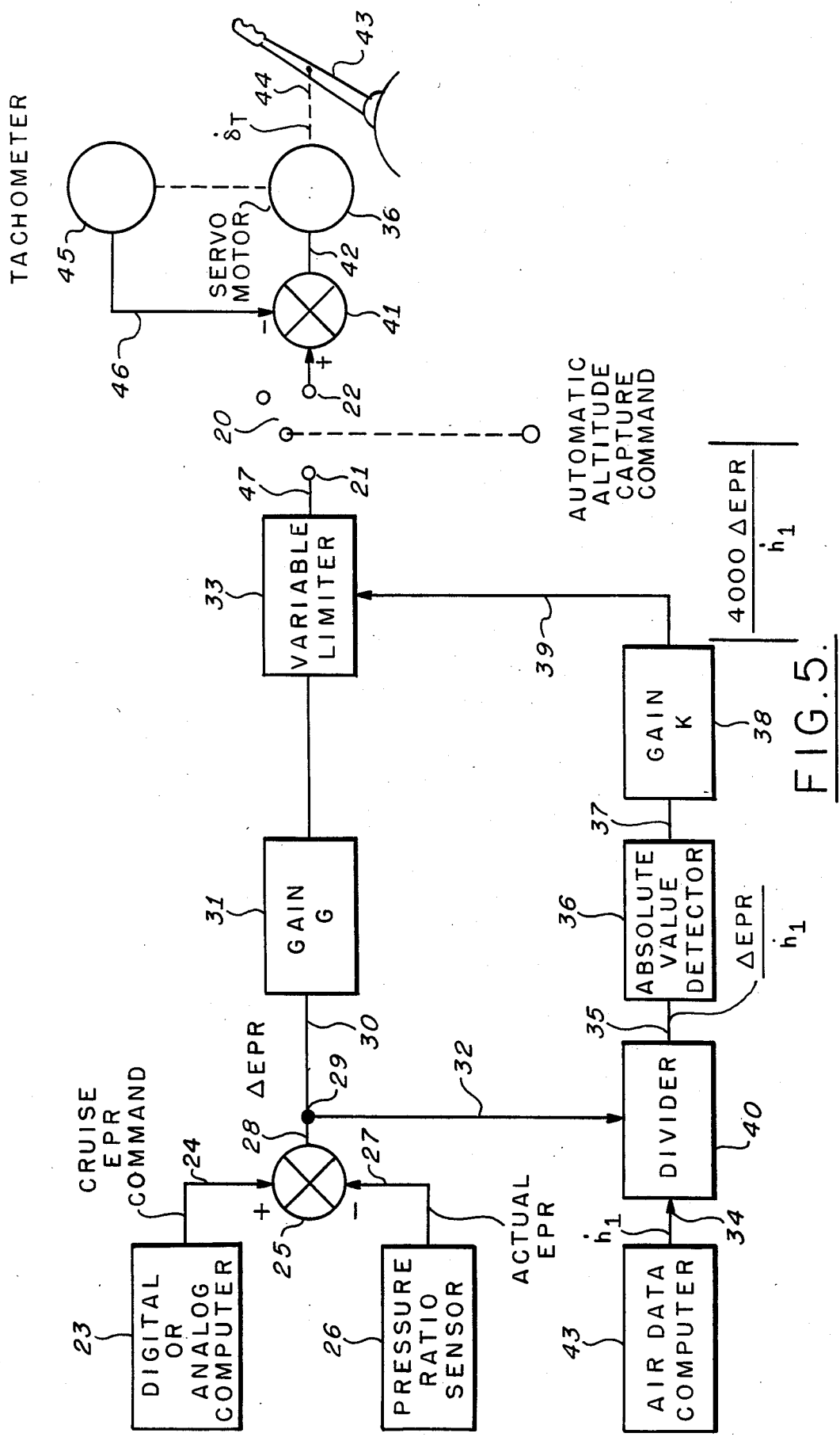
FIG. 5 is a block diagram which illustrates an analog implementation of the throttle control system of the present invention.

The present invention may be implemented by using conventional analog circuitry and computation techniques or by using conventional wholly digital techniques, or by a combination of conventional hybrid digital-analog techniques. For example, summing junctions, limiting functions, and amplifiers may be implemented by operational amplifiers appropriately configured, while logic and mathematical functions may be implemented in a digital computer or the hardware equivalent. Since the functional units represented by the various blocks may be any one of the numerous devices for each respective function well known in the art, it is considered unnecessary to show circuit detail. For clarity and understanding of the invention, it will be explained by using a generally analog format as shown in FIG. 5, it being understood that the same analog format may also represent the programming of a programmable digital computer wherein the various analog inputs are converted to digital signals for digital processing and the various digital outputs are converted to analog signals for driving the throttle servo motor. It will also be appreciated that the system shown is for the control of an individual engine and in the case where multiple engines are provided, each would be controlled by identical circuitry.

A cruise EPR command, which may be calculated using a conventional digital or analog computer 23 or obtained from a look-up table and which represents the required thrust to maintain the desired speed in level flight, considering speed, altitude, and gross weights, appears on lead 24 where it is impressed on the positive input of conventional summation device 25. A pressure ratio sensor 26 is coupled to an engine, not shown, to provide an output signal on line 27 which corresponds to the actual EPR of the controlled engine. This signal is furnished to the negative input of summation device 25. The algebraic difference between the cruise EPR command and actual EPR signal is provided at the output 28 of summing device 25 and is thus a drive signal proportional to ΔEPR, which appears at junction 29 and on lead 30 where it is applied to gain 31. Gain 31 represents an amplifier which boosts the drive signal into a command signal to drive servo motor 36. Interposed between gain 31 and servo motor 36 is a variable limiter 33. The limiting threshold of limiter 33 is controlled by a combination of the altitude rate signal $\dot{h}_1$ and the engine pressure ratio drive signal ΔEPR. Lead 32 supplies the ΔEPR signal to divider 40 as the numerator. The actual altitude rate $\dot{h}_1$ of the aircraft is supplied by a conventional air data computer 43 for injection on lead 34 as the denominator to divider 40 and may be derived for example by differentiating altitude. The output of divider 40, which represents the control signal $\Delta EPR/\dot{h}_1$, appears on lead 35 and is thereby supplied to conventional absolute value detector 36. Detector 36 provides a unipolar output coupled via lead 37 to gain 38. Absolute value detector 36 operates in the conventional manner and will output a positive signal identical in magnitude with $\Delta EPR/\dot{h}_1$ regardless of the input polarity of the signal on lead 35. Detector 36 is one of a conventional class of circuits adapted for rectifying both polarities of a bipolar input signal so that a signal of only positive polarity appears on lead 37 for application to gain 38. Gain 38 has a gain value proportional to the value of K in equation 23, which may typically be a value of 4,000. The modified control signal from gain 38 appears on lead 39 and represents the solution to the control law of equation (28), $\dot{\delta}\tau = K\Delta EPR/\dot{h}_1$, and controls the magnitude of the limit of variable limiter 33. Thus, the available output command signal from limiter 33 varies with the input values of the cruise EPR command, the actual EPR, and the altitude rate signal.

Switch arm 20 when actuated makes contact with normally open contact 22, thereby allowing the command signal from limiter 33 appearing at contact 21 to be directed to drive servo-motor 36. The output of limiter 33 appears on lead 47 and is conveyed to summation device 41 through contact 21, switch arm 20 and contact 22. The output of summing junction 41 is coupled via lead 42 and appears as a throttle rate command to drive the conventional throttle control servo-motor 36 which actuates the manual throttle control handle 43 through mechanical linkage 44. Feedback tachometer 45 is mechanically coupled to sero-motor 36 and provides a signal on lead 46 which is directly proportional to the rotational speed, i.e., the rate of change of position of the output shaft, of servo-motor 36. This rate voltage is coupled by lead 46 to summing junction 41, where it is algebraically combined with the engine pressure ratio command signal and the difference fed to servo-motor 36. Not shown are conventional power supplies and tachometer and servo-motor excitation circuitry necessary to provide an operational system, as is well known in the art.

In operation, when the aircraft engages in an altitude hold maneuver, switch arm 20 is enabled by the automatic altitude capture command and engages contact 22, thereby coupling the amplitude limited command signal at 47 to the servo loop comprised of junction 41, servo-motor 36 and tachometer 45, the action of which remains to be described.

Computer 23 furnishes a signal corresponding to the commanded EPR required to maintain the desired speed at the desired altitude. The engine throttle control system is responsive to EPR. Sensor 26 provides a signal corresponding to the actual EPR, representing engine thrust at any instant of time. The difference of these terms provides the resultant $\Delta$EPR which appears at junction 29. This servo drive signal is amplified in gain 31 and is then coupled though limiter 33 where it appears as a command signal at switch terminal 21. The signal at this point has sufficient amplitude to drive the throttle control servo motor 36. However, the maximum amplitude must be limited in order to assure accurate speed control during altitude capture maneuvers, whereby excessive thrust output is not demanded from the engines. That is the function of the divider loop shown in FIG. 5. Computere 43, which may be furnished with altitude data from radar or barometric sensors or the like, develops the altitude rate signal $\dot{h}_1$ shown at lead 34. The factors $\Delta$EPR and $\dot{h}_1$ are divided in block 40 to provide a resultant control signal $\Delta$EPR/$\dot{h}_1$ at lead 35 which is coupled to absolute value detector 36. By taking the absolute value of this signal, the resultant output is independent of whether the aircraft is in an ascending or descending maneuver and allows the direction of throttle motion to be determined by the polarity of $\Delta$EPR. The resultant signal on lead 37 is coupled to gain 38 which provides a modified control signal output whose value is 4,000 $\Delta$EPR/$\dot{h}_1$. This corresponds to the maximum allowable value of thrust rate $\dot{\delta}\tau$, as shown in equation (29). The limiting signal developed on lead 39 is introduced into limiter 33 and thereby provides a maximum throttle rate signal at output 47 which is proportional to $\Delta$EPR and inversely proportional to $\dot{h}_1$ in accordance with the desired control law. Since the actual EPR signal at lead 27 may be greater or less than the desired cruise EPR command signal at lead 24, the difference signal $\Delta$EPR may assume positive or negative values as required to correct for the desired throttle thrust rate $\dot{\delta}\tau$. In either case, the maximum rate will be limited to the desired acceptable value.

The limited output signal 47 is then applied through switch arm 20 and contacts 21 and 22 to summing junction 41, which is coupled to servo-motor 36. The command signal on line 42 drives servo-motor 36 in a direction and rate so as to advance or retard the throttle and capture the desired airspeed in a selected altitude capture maneuver. For example if, as in FIG. 1, the aircraft is climbing at maximum EPR, a reduced value of cruise EPR will be commanded, hence the difference signal $\Delta$EPR will have a negative value, and servo-motor 36 will be commanded to retard the throttle. Servo-motor 36 is thereby driven to the desired thrust rate which when coupled to throttle control 43 by linkage 44 will urge the associated aircraft engine to maintain the desired steady state cruise speed and altitude.

To optimize the servo loop performance for a given motor drive system, tachometer feedback is used. When a command signal from limiter 33 is applied to summing junction 41, it drives servo-motor 36 to rotate at a corresponding angular rate. Tachometer 45, coupled to motor 36, responds by providing a rate output proportional to the angular rate of motor 36. The tachometer rate signal is applied to junction 41 and algebraically summed with the servo command signal. Since the two signals at junction 41 are oppositely polarized, tachometer 45 effectively provides negative feedback for stabilizing the servo loop. The system gains are scaled so that the resultant drive to motor 36 is nulled out once motor 36 achieves a desired rate. Should motor 36 depart from the desired rate by even a slight change in speed, the tachometer rate signal will accordingly reduce or increase, so that the resultant drive signal coupled to motor 36 tends to maintain a constant rate proportional to the magnitude and sign of the drive signal from limiter 33. When the desired cruise speed is obtained, $\Delta$EPR goes to zero. This commands servo-motor 36 to cease rotation. Should there be any departure from the nulled condition, tachometer 45 will provide an opposing signal through junction 41, thus tending to stabilize the servo loop in the null state. Such action comprises the well-known principle of rate servo mechanisms. As the servo-motor drives the throttle linkage towards the desired thrust setting, the drive signal $\Delta$EPR decreases, dropping to a value of zero when cruise airspeed has been reached. As the aircraft proceeds along the flight path illustrated in FIGS. 1 and 2, the changing value of $\Delta$EPR from limiter 33 and the changing value of $\dot{\delta}\tau$ from gain 38 continuously vary the magnitude and direction of the throttle command signal. Since servo-motor 36 is mechanically attached to the engine throttle 43 in the cockpit by conventional linkages, pulleys, cables, and the like, represented by lead 44, it thereby controls the rate of the manual throttle control movement in the desired fashion to maintain the aircraft at an optimal thrust rate of change and thereby to maintain the desired airspeed and altitude. It is seen that the apparatus of FIG. 5 thereby provides a throttle rate command signal proportional to the change in thrust required to achieve the commanded airspeed, with a maximum throttle rate limited in accordance with equation (29). Thus, when the aircraft requires a large thrust adjustment or is climbing or descending at a relatively slow rate, or both, the throttles will be driven at a relatively slow rate. It will be appreciated from the foregoing description that the present invention thereby acts to restrict the rate of throttle handle movement by a variable limit during automatic altitude capture maneuvers in such a manner as to maintain the speed of the aircraft.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Engine control apparatus for an automatic flight control system including a throttle position controller for urging an aircraft to capture a commanded airspeed during an altitude capture maneuver comprising:
   means responsive to an operational characteristic of said engine for generating a signal representing actual engine thrust,
   means for generating a signal representing a predetermined engine thrust at said commanded airspeed and a predetermined altitude, means for generating a signal representing an actual rate of change in altitude, means for combining said actual engine thrust signal, said predetermined engine thrust signal and said altitude rate signal for generating a command signal to drive said throttle position controller for urging said aircraft to capture said airspeed.

2. Apparatus as set forth in claim 1, wherein:

said means for generating said signal representing actual engine thrust comprises means for providing a signal proportional to actual engine pressure ratio.

3. Apparatus as set forth in claim 2, wherein:

said means for generating a signal representing said predetermined engine thrust comprises means for providing a signal proportional to the desired engine pressure ratio required to maintain said commanded speed in a level flight path at said predetermined altitude.

4. Apparatus as set forth in claim 3, wherein said means for combining said actual engine thrust signal, said predetermined engine thrust signal, and said altitude rate signal further comprises:

means for providing a drive signal proportional to the algebraic difference between said actual engine pressure ratio signal and said desired engine pressure ratio signal, and means for providing a control signal proportional to the ratio between said drive signal and said altitude rate signal.

5. Apparatus as set forth in claim 4, wherein the value of said command signal does not exceed a predetermined maximum value governed by said control signal.

6. The apparatus as set forth in claim 5, further including amplitude limiter means for limiting said drive signal to said maximum value.

7. The apparatus as set forth in claim 6, said limiter means further comprising variable limiter means responsive to said control signal.

8. The apparatus as set forth in claim 7, further comprising absolute value detector means for receiving said control signal and for providing a unipolar output to said variable limiter means.

9. Apparatus as set forth in claim 8, wherein said throttle position controller further comprises:

a manual throttle control, and closed-loop servo means coupled to a linkage for driving said manual throttle control, responsive to said command signal, said manual throttle control coupled to said engine for controlling said actual engine pressure ratio.

10. Apparatus as set forth in claim 1, wherein said command signal for urging said aircraft to capture said commanded airspeed varies in accordance with a control law comprising:

$$\dot{\delta\tau} = K\Delta EPR/\dot{h}_1$$

where $\dot{\delta\tau}$ is the throttle rate required to maintain said commanded airspeed during said altitude capture maneuver, $\Delta EPR$ is the difference between engine pressure ratios at two distinct throttle positions, $\dot{h}_1$ is the actual rate of change of altitude of the aircraft, and K is a constant of proportionality relating the maximum allowable acceleration normal to the aircraft flight path during said altitude capture maneuver and the slope of the ratio of said throttle controller position to engine pressure in the region of $\Delta EPR$.

11. Apparatus as set forth in claim 10, wherein said two throttle positions comprise a first actual position during the course of said altitude capture maneuver and a desired position at the completion of said maneuver.

12. Apparatus as set forth in claim 11, wherein said constant K has a value of 4000.

13. Apparatus for controlling an engine through a throttle linkage including an automatic flight control system and an automatic throttle position controller to provide airspeed control of an aircraft during an altitude capture maneuver, wherein:

said linkage is responsive to a command signal that varies in accordance with:

$$\Delta\tau = K|\Delta EPR/\dot{h}_1|$$

where $\dot{\delta\tau}$ is the required throttle rate to maintain a commanded speed during said altitude capture maneuver, $\Delta EPR$ is the difference between engine pressure ratios at two distinct throttle positions, $\dot{h}_1$ is the actual rate of change of altitude of said aircraft, and K is a constant of proportionality relating the maximum allowable acceleration normal to the aircraft flight path and the slope of the throttle controller position vs engine pressure ratio in the region of $\Delta EPR$, the combination further comprising:

means for providing a signal proportional to said altitude rate $\dot{h}_1$, means for providing a signal proportional to said engine pressure ratio difference $\Delta EPR$, divider means responsive to said engine pressure ratio difference and said altitude rate signal for providing a signal proportional to the ratio thereof, means responsive to said divider signal for providing a further signal proportional to the absolute value thereof, gain means responsive to said absolute value signal for providing a control signal, variable amplitude limiter means responsive to said control signal and said engine pressure ratio difference signal, for reducing a limit imposed on the value of said command signal when said ratio signal is at a low value and for increasing the value of the limit imposed on said command signal when said ratio signal is at a high value, and for limiting said command signal to a predetermined maximum value, and means for driving said linkage, responsive to said command signal.

* * * * *